Aug. 18, 1931.  C. D. McDONALD  1,819,431
APPARATUS FOR FORMING SCROLL EDGE METAL BLANKS
Original Filed July 7, 1927   3 Sheets-Sheet 1
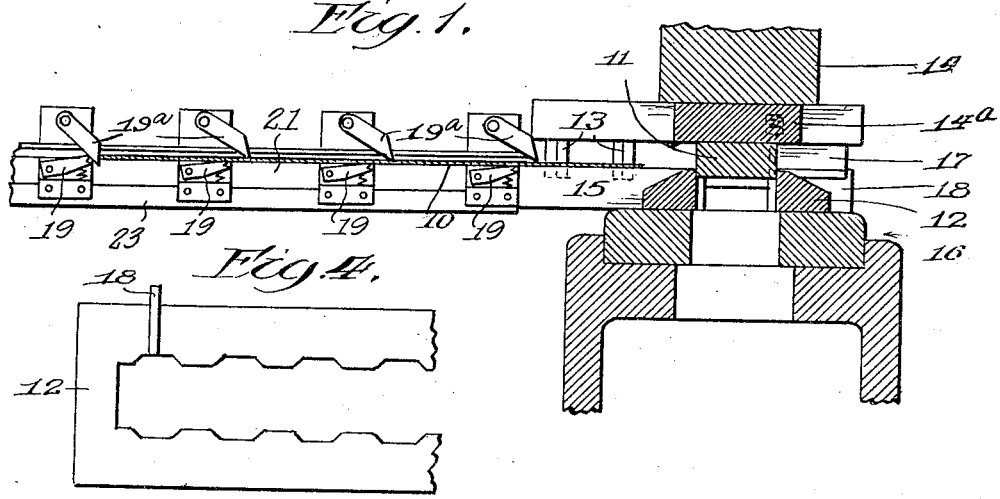
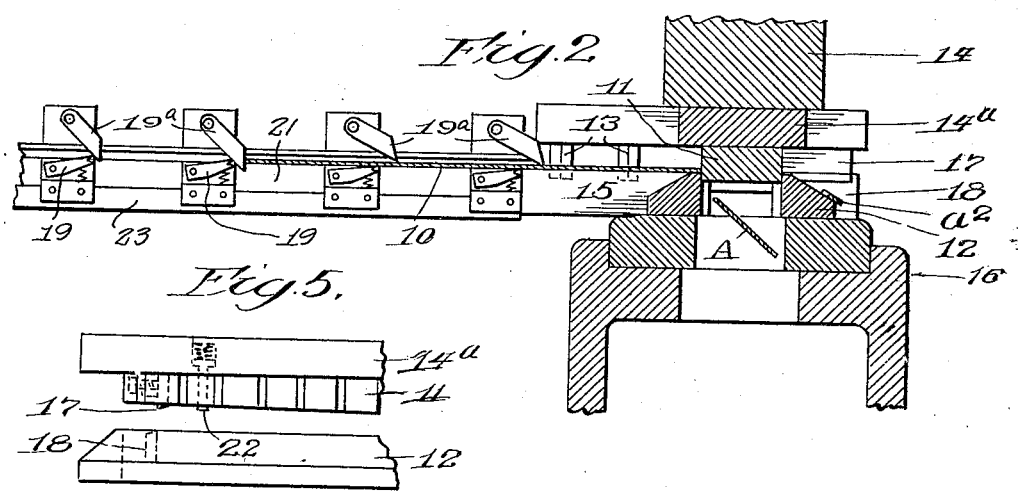
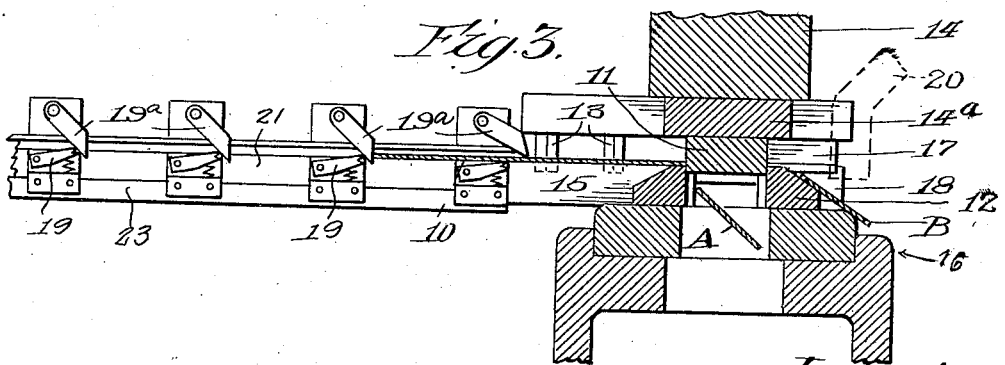
Inventor:
Charles D. McDonald

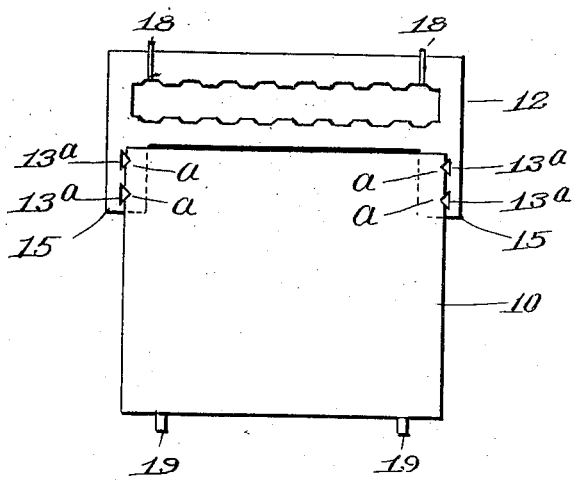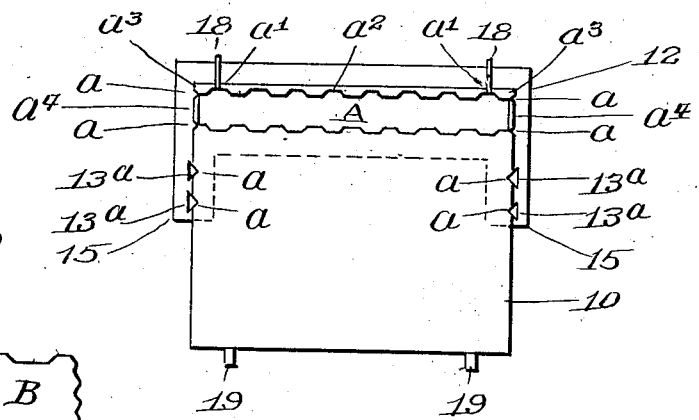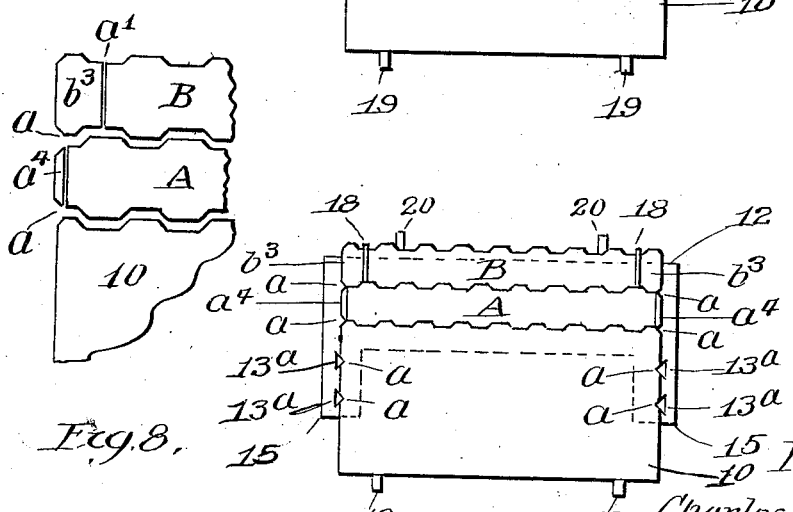

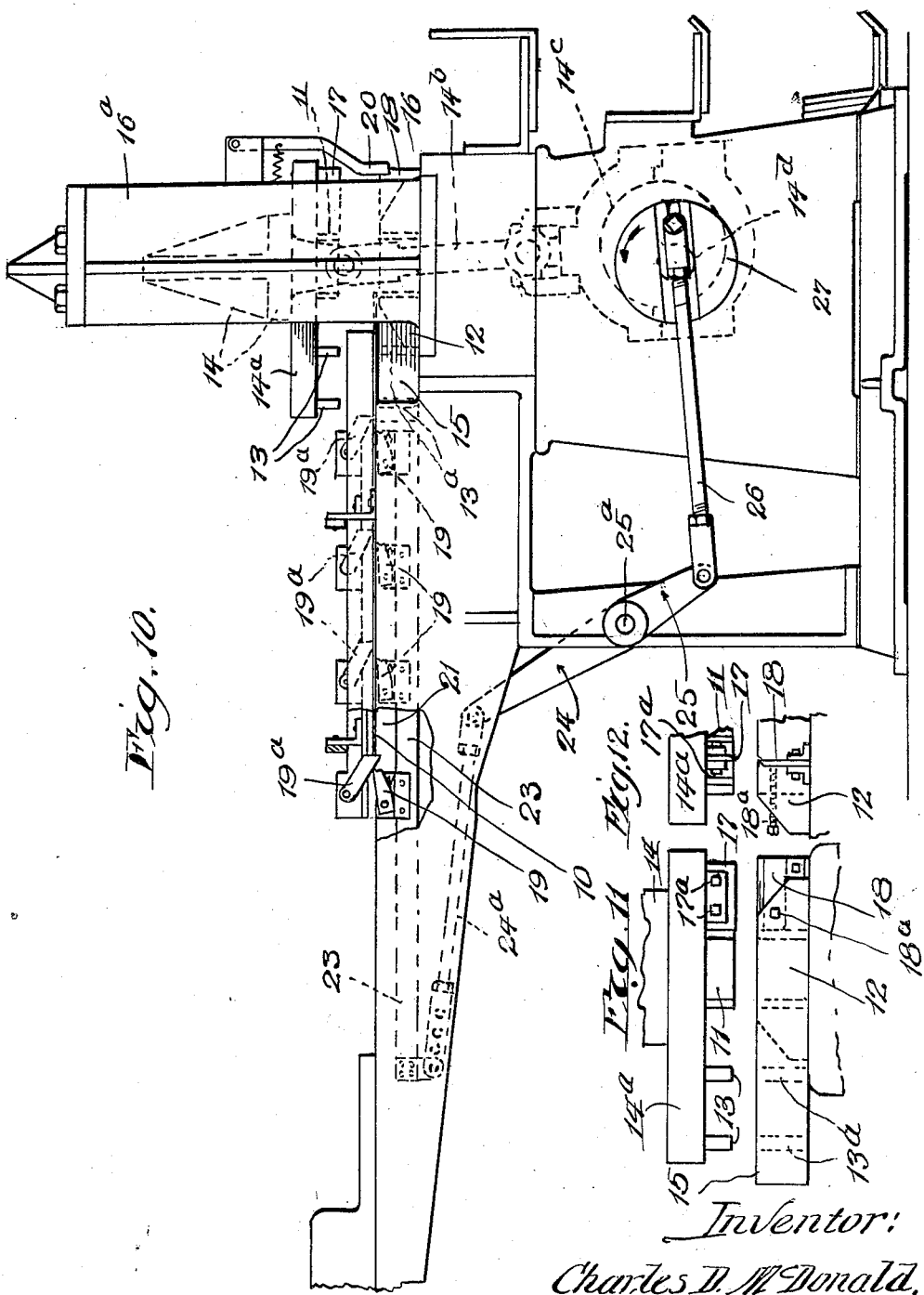

Patented Aug. 18, 1931

1,819,431

UNITED STATES PATENT OFFICE

CHARLES D. McDONALD, OF CHICAGO, ILLINOIS, ASSIGNOR TO McDONALD MACHINE CO., OF CHICAGO, ILLINOIS, A CORPORATION OF ILLINOIS

APPARATUS FOR FORMING SCROLL-EDGE METAL BLANKS

Original application filed July 7, 1927, Serial No. 203,963. Divided and this application filed October 21, 1929. Serial No. 401,155.

This invention relates to apparatus for forming scroll-edge metal blanks.

One of the objects of the present invention is to provide improved mechanism for cutting or shearing metal sheets into scroll-edge blanks, whereby a less number of shearing operations are required than heretofore for producing the finished scroll-edge blanks. For cutting or shearing metal sheets into scroll-edge blanks, a scroll-edge shearing machine is usually employed which includes dies or other scroll-edge cutting devices, and heretofore it has been found that considerable work is entailed in sharpening certain of the cutting knives or dies thereof. One object of this invention is the provision of shearing apparatus wherein certain knives may be readily and quickly removed from their supports and sharpened.

Heretofore it was thought necessary to trim the forward edge of the sheet and to shear out the first scroll-edge strip from the space on the metal sheet where the second scroll-edge blank space is located, and subsequently to shear out the scroll-edge strips from the alternately located places. In accordance with the present apparatus, the first scroll-edge blank or strip sheared out, is the one located adjacent the forward edge of the sheet, and thereafter the alternately located strips are sheared out, the intermediate ones falling as an incident to such shearing operation. The trimming of the forward and rear edges of the sheet is done co-incident with the blanking or shearing operations.

As is well understood, in order to obtain the greatest number of scroll-edge blanks from a sheet of given dimension, there should be no waste except at the edges of the sheet, and in order to obtain this result, the wide portions of each scroll-edge blank are formed out of the narrow portions located between the wide portions of the adjacent blanks. Consequently, there is one more usable wide portion in each of the alternate blanks than in the intermediate ones, but the intermediate ones contain wide end portions that are usable as recoveries for other purposes. One of the objects of this invention is to cut the usable recoveries from the intermediate strips while the alternate full length ones are being blanked out. Another object is to trim off the waste in such manner that it will not interfere with the operation of the dies.

With these and other objects and advantages in view, this invention consists in an apparatus for forming scroll-edge blanks having dies for notching the side edges of the sheet and other dies for blanking or shearing out scroll-edge blanks from the sheet at places between the preformed notches, and other shearing means for cutting away the recoveries at the ends of the blanks which are sheared off the sheet beyond the ones that are blanked out of the sheet.

The invention further consists in the several novel features hereinafter fully set forth and claimed.

The invention is clearly illustrated in the drawings accompanying this specification in which—

Figure 1 is a vertical longitudinal section through a portion of a metal shearing machine embodying a simple form of the present invention, and showing the metal sheet in a position occupied during the first step in the operation of the machine in forming scroll-edge blanks therefrom;

Fig. 2 is a view similar to Fig. 1, showing the sheet in the position occupied during the second step of the operation of the machine;

Fig. 3 is a view similar to Fig. 1, showing the sheet occupying a position during the third step of the operation;

Fig. 4 is a plan of a fragment of the lower die;

Fig. 5 is a side elevation of fragments of the upper and lower dies;

Fig. 6 is a diagrammatic view of a metal sheet and the lower die of the scroll-edge shearing machine and illustrating the first step in the operation of the machine in shearing out the blanks;

Fig. 7 is a view similar to Fig. 6, showing the second step in the operation;

Fig. 8 is a view similar to Fig. 6, showing the third and similar subsequent steps in the operation of the machine;

Fig. 9 is a fragmental plan of a metal sheet showing a part of the same sheared into blanks;

Fig. 10 is a side elevation, partly broken away, of a scroll shearing machine embodying a simple form of the present apparatus for forming scroll edge metal blanks;

Fig. 11 is a fragmental end elevation of the dies and knives; and

Fig. 12 is a fragmental side elevation thereof.

The present invention has been illustrated more or less diagrammatically in the drawings in connection with a scroll-edge shearing machine of the type shown and described in my prior Patent No. 1,110,810 for metal shearing machines, dated September 15, 1914. In accordance with the present invention, as well as the machine disclosed in my prior patent, the metal sheet is fed between upper and lower scroll-edge dies in a step by step manner by suitable sheet feeding mechanism and the scroll-edge blanks are cut or sheared out by dies as will be hereinafter explained.

Scroll-edge blanks are prepared for use in blanking out therefrom circular or other suitably shaped articles, such as tin can tops and bottoms, and in order to obtain the greatest number of such articles from a metal sheet of given size, scroll-edge blanks or strips are first cut from the sheet in such manner that the wider portions of the blanks are cut from the parts that form the narow portions of the contiguous blanks. The wider portions of the blanks are the parts thereof from which the round or other shaped articles are blanked out. The scroll-edge dies are shaped to cut the scroll-edges on both sides of all of the blanks and also to cut the ends of the blanks that are blanked out of the sheet and pass through the lower die.

Referring more particularly to the accompanying drawings, the upper scroll-edge die 11 is mounted upon the ram 14 of the metal shearing machine and the lower scroll-edge die 12 is mounted upon the bed 16 of the machine. The shearing edges of the dies may be of the configuration shown in Fig. 4, whereby to shear out strips commonly known as "scroll-edge blanks" having wide portions connected by narrow ones.

Associated with the upper die 11 are punches 13 which are located adjacent the ends of the die 11, and said punches co-operate with dies 15 that are associated with the lower die 12 to form notches in the side edges of the sheet between which the full length scroll-edge blanks are sheared out. The dies 15 have openings 13$^a$ to receive the punches 13. The upper die 11 and punches 13 may be fastened to a backing plate 14$^a$ which is secured to the ram 14. Usually the metal sheets operated upon are slightly wider than the length of the upper die 11, whereby the scroll-edge blanks may be sheared out from within the confines of the sheet, and the punches 13 are arranged to operate on the sheet in advance of the die 11, to thereby form the notches in the sheet before the blank is sheared out therefrom. The location of the punches 13 with respect to the main dies is clearly illustrated in Figs. 6 to 8.

Associated with the upper die 11 are knives or blank trimming members 17 which may be secured to the backing plate 14$^a$ by screws or bolts 17$^a$, and co-operating with said knives are companion knives or blank trimming members 18 that are fastened to the lower die 12 by screws or bolts 18$^a$. Said knives 17 and 18 are located directly beyond the upper die 11 and the corresponding opening in the lower die 12 at places midway between the endmost wide portions of the opening in the die 12. Said strip trimming knives 17 and 18 serve to trim off recoveries from the end of a strip which is located beyond the one which is being blanked out from the sheet, as will presently appear.

If desired, suitable stop members 20 (see Figs. 3 and 8) may be provided to position the sheet over the lower die 12, and this is particularly desirable when performing the shearing operations after the first strip A has been sheared out from a sheet. The stop members 20 are provided to engage with the forward edge of the metal sheet and they have oblique edges that engage with the oblique parts of the scroll-edges of the sheets. Such an arrangement provides means for accurately locating the metal sheet in position over the lower die. Spring pressed buttons 22 (see Fig. 5) may be provided in the upper die 11 for engagement with a projecting strip, said buttons serving to hold the strip until the knives 17 and 18 separate the recoveries from the strip.

Associated with the dies 11 and 12 is a table or platform 21 upon which the metal sheets are fed in a step by step manner to the dies. As in my prior patent, feed mechanism, including fingers 19 that are reciprocated by suitable mechanism is employed for feeding the sheet to the dies. As in my prior patent above referred to, the feed mechanism for the fingers 19 may comprise finger bars, one of which is shown at 23, to which the fingers 19 are secured. The finger bars are reciprocated in timed relation to the reciprocating movements of the ram 14 by mechanism driven from the drive shaft 14$^d$ by connections, here shown as comprising links 24$^a$ connected to the finger bars, arms 24 mounted on a shaft 25$^a$ journaled in the frame of the machine and connected to the links 24$^a$, and an arm 25 mounted on one end of the shaft 25$^a$ and connected to the link 26 which is connected to and reciprocated by a crank wheel 27 mounted upon the drive shaft 14$^d$.

Above the feed fingers are gauge fingers 19$^a$ which are mounted upon stationary supports and co-operate with the stop members 20 to position the sheet over the lower die. The ram 14 is driven from the main shaft $14^d$ by eccentrics $14^c$ and link connections $14^b$ between the ram and eccentrics. The feed mechanism operates to advance the sheet at each operation a distance equal to the width of two blanks measured from center to center. The knives 17 and 18 have straight cutting edges which may be readily sharpened. The knives may be removed by loosening the screws or bolts $17^a$ and $18^a$.

In the operation of the mechanism, the sheet feeding mechanism feeds the sheet 10 towards the dies in a step by step manner, the forward end portion of the sheet being first arrested at a position between the punches 13 (see Figs. 1 and 6). Upon the down stroke of the ram, the punches 13 punch out the notches $a$ in the side edges of the sheet adjacent its forward end. On the up stroke of the ram, the feed mechanism feeds forward the sheet one step bringing the portion of the sheet located between the notches $a$ over the opening in the lower die 12, and on the down stroke of the ram, the dies 11 and 12 shear out a scroll-edge blank A between the notches $a$, as illustrated in Figs. 2 and 7, during which time the punches 13 again form other notches $a$ in the side edges of the sheet.

While the first scroll-edge blank A (see Fig. 7) is being sheared from the metal sheet, the forward edge portion $a^2$ of the sheet is trimmed off as a result thereof (which edge portion is scrap) and two small end pieces $a^3$ are sheared off at the ends $a'$ of said scrap by the knives 17 and 18. Two narrow short strips $a^4$ (contained between the previously formed notches $a$) are formed when the blank A is sheared out, and said strips are also scrap material. The sheared out blank A falls through the opening in the lower die 12 into a suitable receptacle and the scrap material $a^2$ which was cut from the end of the sheet falls down over the lower die 12.

Upon the up stroke of the ram, the sheet is fed forward again bringing the scroll-edge portion of the sheet (see Fig. 8) beyond the opening in the lower die 12 and bringing the portion of the sheet which is located between the notches $a$ directly over said opening. On the down stroke of the ram, two scroll-edge blanks A and B are sheared out of the sheet, the blank A being punched down through the opening in the lower die, and blank B being the part which is sheared off the sheet when the blank A is sheared out. Simultaneously the knives 17 and 18 trim off the recoveries $b^3$ at the ends $a'$ of the blank B and the punches 13 form the next set of notches $a$. A full length blank A is thereby formed from within the confines of the sheet, which blank is of precisely the right length, and a short length blank B is also formed of precisely the right length to match, end for end, with the blank A when feeding the blanks to a die press for the purpose of blanking out can ends. In each of the subsequent steps, two such scroll-edge blanks A and B are sheared out of the metal sheet and the recoveries $b^3$ formed as before, and when the last blank is thus sheared out, a narrow strip, similar to the one lettered $a^2$ in Fig. 7, is left which forms scrap material.

It is to be observed that at the third step, as seen in Fig. 8, and at the subsequent steps, the forward edge portion of the metal sheet is fed forward beyond the die 11, a distance equal to the width of a blank, measuring from center to center. Consequently, the dies 11 and 12 shear off a blank A behind the protruding part of the sheet, and the blank thus sheared out falls through the lower die, while the blank B which is sheared off the protruding portion of the sheet falls forward into a suitable receptacle. It is also to be observed that by forming the notches $a$ in the side edges of the sheet before the scroll-edge blank is sheared from within the confines of the sheet, the unused edge portion of the sheet becomes separated into short pieces which will not interfere with the operation of the dies, but readily fall away leaving the sheet free and clear to be operated upon by the dies in the successive operations. The strips $a^4$ are usually too small for any service, but the recoveries $b^3$ are large enough to enable small articles to be punched out therefrom.

More or less variation of the exact details of construction is possible without departing from the spirit of this invention. I desire, therefore, not to limit myself to the exact form of the construction shown and described, but intend, in the following claims to point out all of the invention disclosed herein.

I claim as new, and desire to secure by Letters Patent:

1. Apparatus for producing scroll-edge blanks from a metal sheet comprising notch cutting dies for cutting notches in the opposite edges of the sheet, a blanking die having two undulated cutting edges and transverse end cutting edges, said blanking die being of less length than the width of the sheet and arranged to blank out a scroll-edge blank between the notches and therewith leave an end portion of the sheet in advance thereof, and shearing members disposed transversely to said advance end portion for trimming off recoveries from said advance end portion of the sheet.

2. Apparatus for forming scroll-edge blanks comprising notching members for forming spaced notches on the side edges of a metal sheet, scroll-edge blanking dies located beyond said notching members and adapted to shear out from within the confines of said sheet at a place between said notches a full length scroll-edge blank, means for advancing said sheet to bring the notched portion thereof in register with said blanking dies, and shearing members for shearing off recoveries from the part of the sheet fed beyond the dies.

3. Apparatus for producing scroll-edge blanks from a metal sheet comprising notching dies for at least one side edge of the sheet, blanking dies having two undulated cutting edges and transverse end cutting edges, said blanking dies being of less length than the width of the sheet and arranged to blank out a scroll-edge blank between the notches and therewith leave another blank in advance thereof, and shearing members associated with said dies for trimming off recoveries from said other blank.

CHARLES D. McDONALD.